US006931353B2

(12) United States Patent
Blazek

(10) Patent No.: US 6,931,353 B2
(45) Date of Patent: Aug. 16, 2005

(54) METHOD OF PREDICTING MOTOR PERFORMANCE BASED ON CRML MATERIAL PROPERTIES

(75) Inventor: Kenneth E. Blazek, Crown Point, IN (US)

(73) Assignee: Ispat Inland Inc., East Chicago, IN (US)

(*) Notice: Subject to any disclaimer, the term of this patent is extended or adjusted under 35 U.S.C. 154(b) by 41 days.

(21) Appl. No.: 10/641,407

(22) Filed: Aug. 15, 2003

(65) Prior Publication Data

US 2004/0088139 A1 May 6, 2004

Related U.S. Application Data

(60) Provisional application No. 60/403,967, filed on Aug. 16, 2002, provisional application No. 60/425,393, filed on Nov. 12, 2002, and provisional application No. 60/452,210, filed on Mar. 5, 2003.

(51) Int. Cl.[7] .............................................. G06F 19/00
(52) U.S. Cl. ...................... 702/182; 318/490; 318/492; 324/200
(58) Field of Search .......................... 702/60, 65, 182; 318/490, 492, 558; 724/200, 205, 244, 260; 703/4, 5, 13, 18; 735/209, 296; 310/10

(56) References Cited

U.S. PATENT DOCUMENTS

| 4,442,393 | A | * | 4/1984 | Abbondanti | 318/802 |
| 4,945,508 | A | * | 7/1990 | Benejean | 703/4 |
| 5,619,435 | A | * | 4/1997 | Prakash et al. | 703/3 |
| 5,966,524 | A | * | 10/1999 | Burnett et al. | 703/5 |
| 6,219,629 | B1 | * | 4/2001 | Namiki | 703/13 |
| 6,285,973 | B1 | * | 9/2001 | Nishino et al. | 703/13 |
| 6,324,494 | B1 | * | 11/2001 | Saban | 703/13 |

OTHER PUBLICATIONS

Blazek et al., "New Magnetic Parameters to Characterize Cold–Rolled Motor Lamination Steels and Predict Motor Performance", IEEE, Jul. 2004.*

Internet Web page at www.appliancemagazine.com entitled "New Magnetic Parameters to Characterize Cold–Rolled Motor Lamination Steels and Predict Motor Performance", dated Aug. 2003.*

Timothy et al., "Finite Element Modeling of Laminated Structures in Electrical Machines", IEEE, 1995.*

Internet Web page at www.ansoft.com entitled "RMxprt v5", unknown date of publication.*

Blazek, K.E. and T.A. Bloom, "A Paradigm Shift in the Magnetic Test Criteria for Motors," 21st Annual Conference on Properties and Applications of Magnetic Materials, May 13–15, 2002, 15 pages, Illinois Institute of Technology, Chicago, IL USA.

(Continued)

Primary Examiner—Patrick J. Assouad
(74) Attorney, Agent, or Firm—Baker & Daniels

(57) ABSTRACT

A method of predicting the performance of certain electromagnetic devices is based on the integrated average core loss (IACL) and the integrated average relative permeability (IAP) of the electromagnetic core material used in the devices. The method includes the steps of establishing the range of induced magnetic fields over which the device is designed to operate, measuring the core loss and relative permeability of the core material over the range of induced fields and calculating the IACL and IAP over the range. Performance parameters can then be predicted using equations based on the IACL and the IAP with coefficients and constants derived through linear regression analysis.

17 Claims, 6 Drawing Sheets

OTHER PUBLICATIONS

Williamson S et al., "Finite–element Models for Cage Induction Motor Analysis", IEEE, Oct. 1, 1989, pp. 28–30.

Stumberger B et al, "Analysis of Iron Loss in Interior Permanent Magnet Synchronous Motor Over a Wide–Speed Range of Constant Output Power Operation", IEEE Transactions on Magnetics, IEEE Inc., Jul. 2000, vol. 6, No. 4, pp. 1846–1849.

Garcia J R et al., "A Method for Calculating the Workpiece Power Dissipation in Induction Heating Processes" Applied Power Electronics Conference and Exposition, 1994, APEC '94. Conference Proceedings 1994., Ninth Annual Orlando, FL, USA, Feb. 13, 1994, pp. 302–307.

International Search Report in Correspoding International Patent Application, dated Dec. 19, 2003, 6 pages.

* cited by examiner

IACL, 513-44

──◆── IACL AS A FUNCTION OF DIRECTION
──☐── DAIC
──○── IACL

IAP, 513-44

──◆── IAP AS A FUNCTION OF DIRECTION
──☐── DAIC
──△── IACL 1.5 T CORE LOSS, WATTS/LB.

CORRELATION BETWEEN 1.0 T AND 1.5 T CORE LOSS 1.0 T PERMEABILITY

CORRELATION BETWEEN 1.5 T CORE LOSS AND 1.0 T PERMEABILITY

METHOD OF PREDICTING MOTOR PERFORMANCE BASED ON CRML MATERIAL PROPERTIES

This application claims the benefit of U.S. Provisional Patent Application Ser. Nos. 60/403,967 filed Aug. 16, 2002; 60/425,393 filed Nov. 12, 2002; and 60/452,210 filed Mar. 5, 2003, the complete disclosures of which are hereby expressly incorporated by reference.

BACKGROUND OF THE INVENTION

This invention relates to a method of predicting the performance of certain electromagnetic devices based on the material properties of the electromagnetic core material used in the device, and in particular, to a method of predicting the performance of electric motors based on properties of the core material.

In the manufacture of certain electromagnetic devices such as motors, generators, transformers and the like, electrical grade steels are typically used for the electromagnetic core material. Steel grades specified as cold rolled motor lamination (CRML) steels are most commonly selected. CRML steels are typically relatively low in carbon content and relatively easy to stamp for making laminations.

It is standard practice in the industry today to specify electromagnetic core material based on the core loss and relative permeability of the material at an induced magnetic field of 1.5 Tesla (15 kilogauss). The problem with these standards is that the 1.5 Tesla relative permeability is not an accurate predictor of performance of the electromagnetic devices. In addition to being one of the most difficult characteristics to measure accurately due to the rapid drop off that occurs at the 1.5 Tesla level, theoretical investigation and experimentation have shown that the 1.5 Tesla relative permeability is not a significant factor in the performance of electromagnetic devices.

Relative permeability, particularly the 1.5 Tesla relative permeability, can vary somewhat from lot to lot of the given material made by a given process. This presents an additional problem because the 1.5 Tesla relative permeability cannot be tested until after the material is made and processed into a coil from which laminations can be stamped. The material manufacturer may be forced, at this point, to reject and scrap the coiled material if it is only slightly below the customer's 1.5 Tesla relative permeability specification. This potential for waste drives up material costs.

Because the performance of the finished device cannot be predicted even when the material produced satisfies the 1.5 Tesla relative permeability specification, manufacturers are required to fabricate prototypes of the finished device and then test the prototypes to verify the product's performance. This brings about the potential for further loss of the resources expended in making the device if the required performance goals are not met.

What is needed is a method of reliably predicting the performance of electromagnetic devices based on the magnetic characteristics of the electromagnetic core material. Such a method would be invaluable for motor manufacturers to design new motors and for material producers to design new alloys.

SUMMARY OF THE INVENTION

The present invention provides a method of predicting the performance of certain electromagnetic devices based on two new measures of the magnetic characteristics of the electromagnetic core material. The method is based on the development of equations to calculate performance parameters based on the integrated average core loss (IACL) and the integrated average relative permeability (IAP) of the electromagnetic core material over the range of induced magnetic fields over which the device is designed to operate.

In one embodiment of the invention, the efficiency and stator current of an electric motor, can be predicted by the equations:

Motor Efficiency $(\%) = C1*IACL + K1$

Stator Current $= C2*IACL + K2$ where C1 and C2 are coefficients, and K1 and K2 are constants.

In another embodiment of the invention, motor efficiency can be predicted by the equation:

Motor Efficiency $(\%) = C1*IACL + C2*IAP + K$ where C1 and C2 are coefficients, and K is a constant.

The coefficients and constants in the foregoing equations are derived using linear regression analysis. The values of the coefficients C1, C2 and the constants K, K1, and K2 will vary from one performance parameter to another and from one electromagnetic device to another.

The integrated average core loss (IACL) is determined by measuring the core loss (CL) of the material over the range of induced magnetic fields (B) over which the device is expected to operate and dividing the integral of the measured core loss over the range by the integral of the range of induced fields which is expressed as:

$$\int CL \, dB / \int dB.$$

The IACL can be approximated based on the core loss at an induced field of 1.5 Tesla.

Similarly, the integrated average relative permeability (IAP) is determined by measuring the relative permeability ($\mu_R$) of the material over the range of induced magnetic fields (B) and dividing the integral of the measured relative permeability over the range by the integral of the range of induced fields which is expressed as:

$$\int \mu_R \, dB / \int dB.$$

The IAP can be approximated based on the relative permeability at an induced field of 1.0 Tesla.

It is standard practice to measure magnetic parameters using a material sample containing 50% of the material obtained from the rolling direction (L samples) during production of the CRML steel coil and 50% of the material from the direction perpendicular to the rolling direction (T samples). This however, is not representative of the directions of the CRML steel that are magnetized during the operation of a motor or other electromagnetic devices that use rotational magnetic fields. Since the magnetizing field in a motor is rotational, all directions in the coil are magnetized. Therefore the properties that should be used to predict motor efficiency and stator current should be the directionally averaged IACL (DAIC) and IAP (DAIP) from 0 to 360 degrees angle to the rolling direction. Experimental work has established IACL determined from a standard L&T sample will be from 0.6 to 2.8% lower than the DAIC. Similarly, the IAP determined from a standard L&T sample will be from 1.1 to 5.4% higher than the DAIP. These slight differences have been shown to be negligible for the purpose of predicting motor efficiencies and stator current.

Therefore, for all but the most concise calculations, the IACL and IAP determined from L&T samples are sufficient for the methods described herein.

The inventive method accomplishes a major objective of providing a method of reliably predicting the performance of electromagnetic devices based on the characteristics of the electromagnetic core material.

BRIEF DESCRIPTION OF THE DRAWINGS

The preferred embodiment of the invention will now be described by way of reference to the following drawings wherein.

DESCRIPTION OF THE PREFERRED EMBODIMENTS

Figure 1:
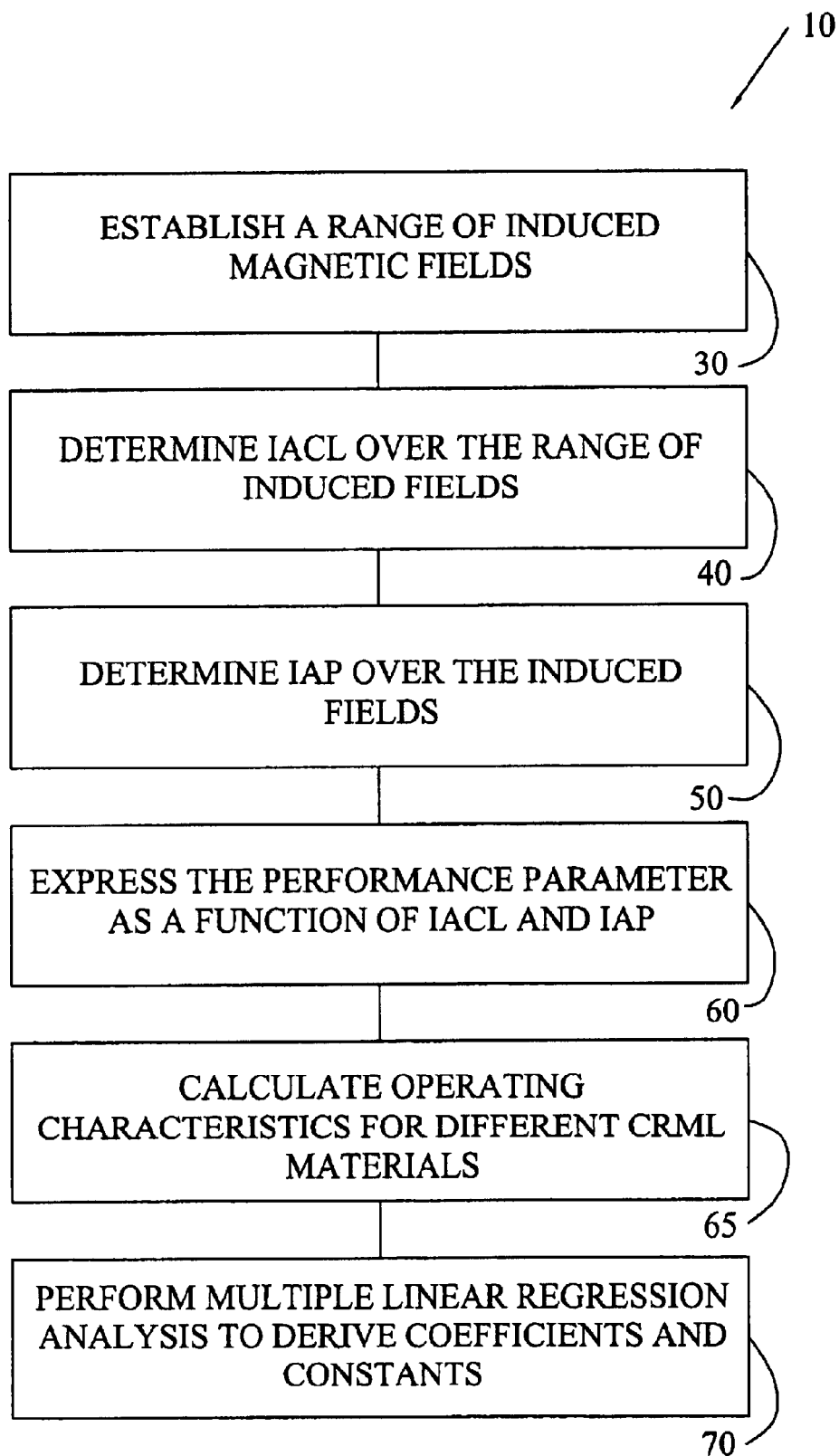
FIG. 1 is a block diagram of a method for predicting the performance of an electromagnetic device in an exemplary embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The invention is a method of predicting the performance of certain electromagnetic devices based on material properties of the cold rolled motor lamination (CRML) steels used in the devices. Traditionally, manufacturers have focused on the magnetic relative permeability of CRML steels at a 1.5 Tesla induced field as the basis for specifying materials for their products. Theoretical investigation and experimentation have shown however, that the 1.5 Tesla relative permeability specification is not a relevant factor to the performance of the finished devices. The method of this invention presents an algorithm based on two new measures of magnetic characteristics of the CRML material, the integrated average core loss (IACL) and integrated average relative permeability (IAP) determined from L&T samples, which can reliably predict certain performance parameters of the finished devices. For very precise calculations for motors alternative new magnetic property characteristics of the CRML material, DAIC and DAIP should be used in place of the IACL and IAP.

In the description that follows, the method will be described in detail with respect to an electric motor as an example. It is to be understood that no limitation is intended thereby and that the method is generally applicable to other electromagnetic devices having electromagnetic cores of CRML material. The IACL and IAP will be used in the following description but the DAIC and DAIP could be used in lieu of the IACL and IAP for more precise calculations if desired.

The method of the present invention is generally represented in the block diagram of FIG. 1. The method 10 begins with the step 30 of establishing a range of induced magnetic fields representative of the range of induced fields over which a motor may be designed to be operated. This of course may vary from one device to another. In this motor example, the range of induced fields was considered to be from 0 to 2 Tesla.

Figure 2:
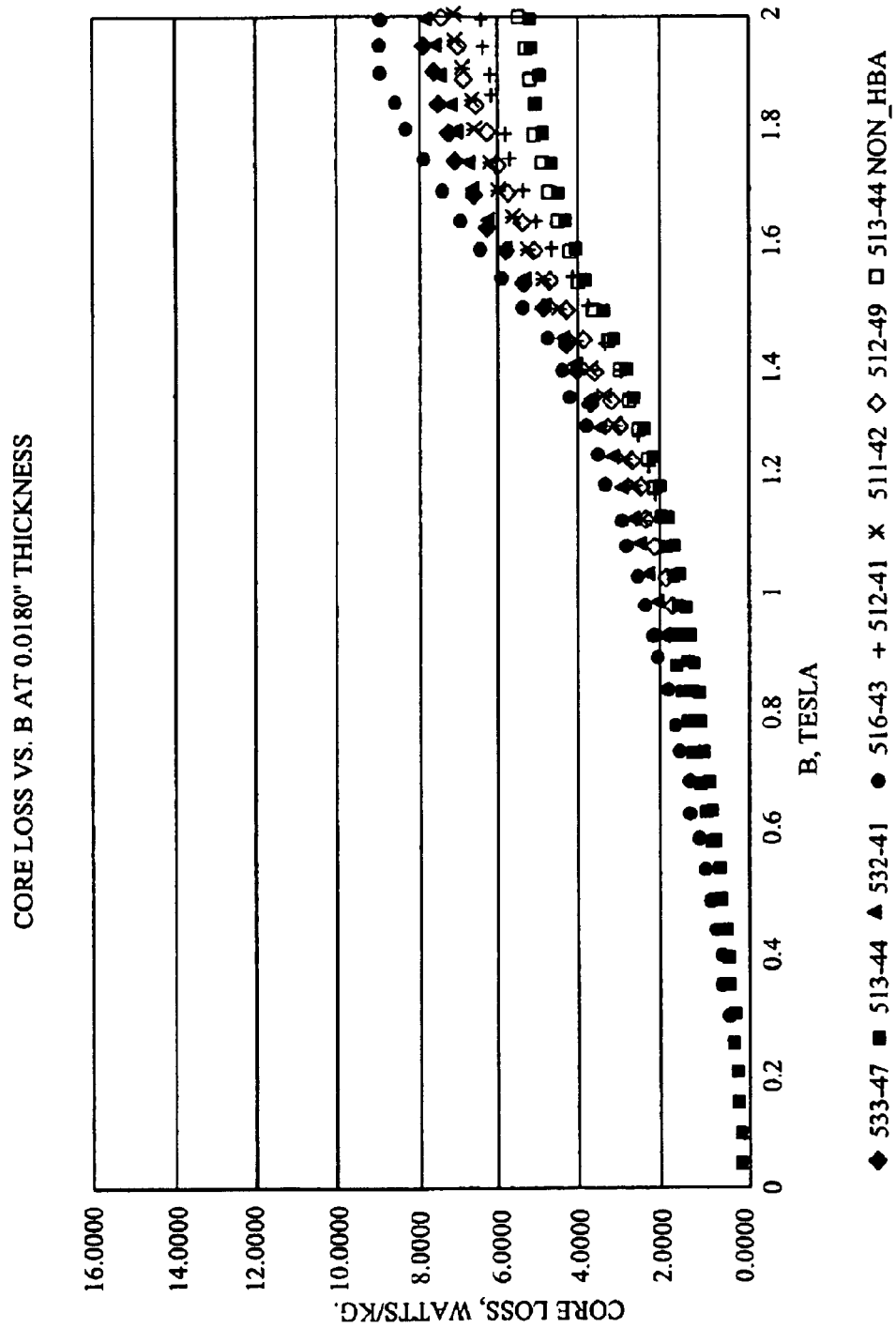
FIG. 2 is a representative plot depicting core loss versus induced magnetic field for a group of steel compositions.

The method continues at step 40 where the integrated average core loss (IACL) of the material is determined. In determining the IACL, it is first necessary to measure the core loss as a function of induced field at a sufficient number of points within the range of induced fields to generate a representative shape of the core loss curve. In this example, core loss was measured at 40 points within the induced field range of 0 to 2 Tesla. A representative plot of core loss (CL) versus induced field (B) for several material compositions derived from an L&T sample is shown in FIG. 2. The IACL is then calculated by dividing the integral of the core loss from 0 to 2 Tesla by the integral of 0 to 2 Tesla as follows:

$$IACL = \int_0^2 CL\,dB \bigg/ \int_0^2 dB$$

At step 50, the integrated average relative permeability (IAP) is determined in a manner to that for IACL. A representative plot of relative permeability ($\mu_R$) as a function of induced field (B) is produced as shown for several material compositions in FIG. 3. IAP is then calculated by dividing the integral from 0 to 2 Tesla of relative permeability by the integral 0 to 2 Tesla as follows:

$$IAP = \int_0^2 \mu_R\,dB \bigg/ \int_0^2 dB$$

Figure 3:
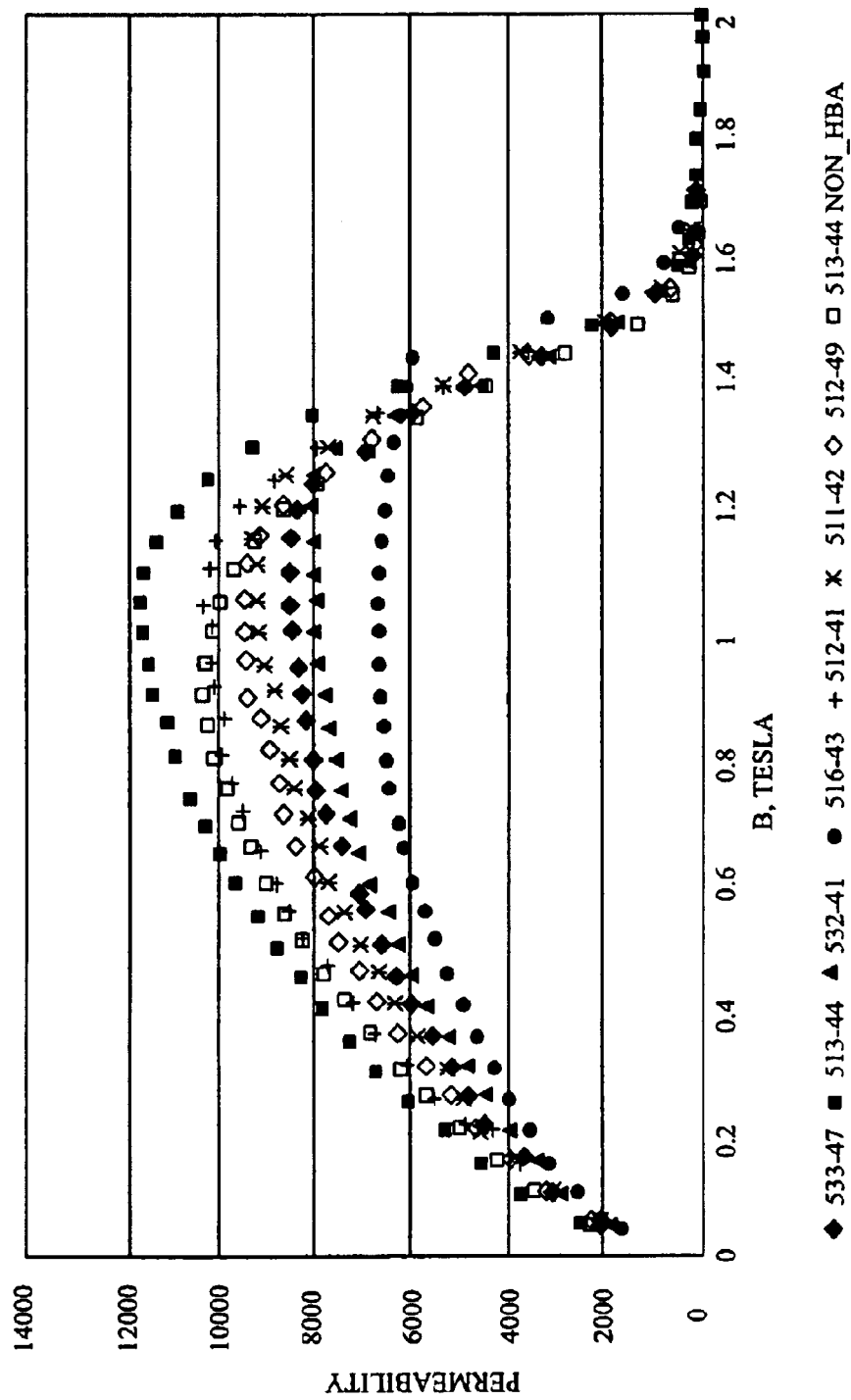
FIG. 3 is a representative plot depicting relative permeability versus induced magnetic field for the steel compositions of FIG. 2.

In order to develop the core loss and relative permeability curves of FIGS. 2 and 3, it is necessary to make material samples. The samples are then analyzed using a suitable magnetic tester. One such tester is the Donart® Magnetic Tester.

Although the determination of IACL is shown in FIG. 1 as preceding the determination of IAP, it is to be understood that the order of these determinations is not significant to the invention and no limitation is intended thereby.

Figure 4:
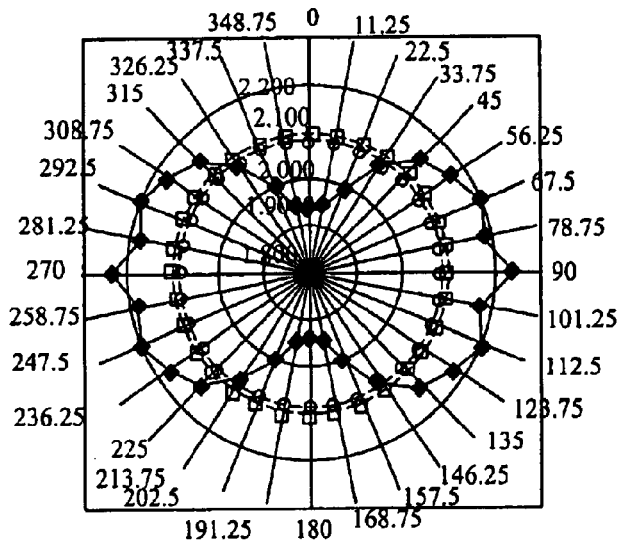
FIG. 4 is a plot depicting IACL as a function of direction.
Figure 5:
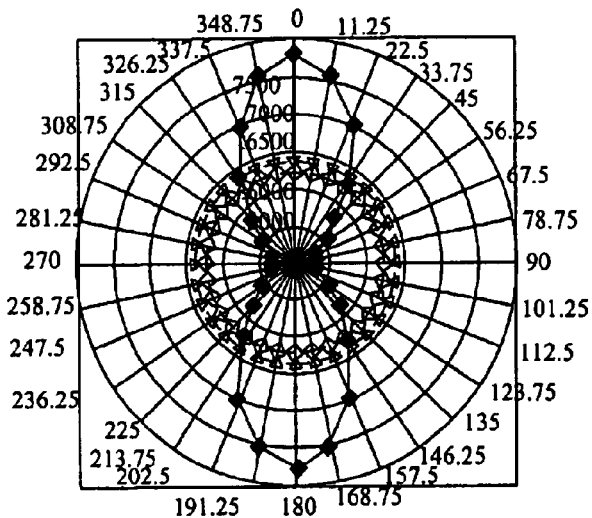
FIG. 5 is a plot depicting IAP as a function of direction.

If it is desired to use the DAIC and DAIP in lieu of the IACL and IAP, samples from many angles to the rolling direction. The different directions must be tested individually on a magnetic tester to determine the IACL and IAP as a function of the angle to the rolling direction from 0 to 360 degrees. A plot of this type of determination is shown in FIGS. 4 and 5 for the IACL and IAP respectively. The DAIC and DAIP are derived by integrating the IACL and IAP from 0 to 360 degrees from the rolling direction and then dividing the value by the integral of the angle to the rolling direction from 0 to 360 degrees. The values for the IACL, DAIC, IAP and DAIP are shown in FIGS. 4 and 5 as circles about the central axis of the polar plot. It can be seen that the difference between the IACL and DAIC as well as the difference between IAP and DAIP are relatively small.

At step 60, the selected performance parameter for measurement is assumed to be a function of IACL and IAP. For example, motor efficiency can be expressed as:

$$\text{Motor Efficiency (\%)} = C1*IACL + C2*IAP + K$$

where C1 and C2 are coefficients for IACL and IAP, respectively, and K is a constant.

At step 65, a suitable, verified motor model that allows the core loss and relative permeability curves for a CRML as input is used to calculate the operating characteristics, including the selected performance parameter, for a given motor design and different CRML materials. A model of this type is RMxprt made by Ansoft Corporation. Alternatively, prototype motors could be fabricated and tested to measure the performance parameters of interest for a variety of different CRML materials.

At step 70, a linear regression analysis is performed to derive the coefficients C1 and C2 and constant K. For performance parameters that are influenced by multiple variables, a multiple linear regression analysis is performed. In the case of a small single phase induction motor, the equation for predicting efficiency can be expressed as $$\text{Motor Efficiency(\%)} = -0.391584*IACL + 0.000038*IAP + 90.279626.$$

The coefficients −0.391584 for IACL and 0.000038 for IAP, and the constant 90.279626 in the motor efficiency equation were determined based on calculations for a 59-frame motor manufactured by A.O. Smith®. The regression analysis yielded an $R^2$ value slightly above 0.91. Testing on other motor designs has proven the validity of the equation for motors generally. It is to be expected, however, that with any given motor design, some small variation in $R^2$ may result.

Similar work for a small three-phase induction motor has shown that the equation for predicting efficiency can be expressed as $$\text{Motor Efficiency (\%)} = -0.78113*IACL + 0.000025*IAP + 84.742159.$$

The coefficients −0.78113 for IACL and 0.000025 for IAP, and the constant 84.742159 in the motor efficiency equation were determined based on calculations for a 56-frame motor manufactured by A.O. Smith®. The regression analysis yielded an $R^2$ value slightly above 0.92. Testing on other motor designs has proven the validity of the equation for motors generally. It is to be expected, however, that with any given motor design, some small variation in $R^2$ may result and the magnitude of the coefficients will vary depending on the motor design and type. In the two examples above, it is shown that the three-phase induction motor's efficiency will be decreased by twice the amount that a single-phase induction will experience for a similar change in IACL based on the fact that the coefficient for IACL is twice the value for the same coefficient in a single-phase motor.

While the combination of IACL and IAP yield the best prediction of motor efficiency, the IACL is the most predominant factor as evidenced by the coefficients of these parameters. As a result, the IAP can be ignored and motor efficiency can be expressed as follows with only a slight reduction in the $R^2$ value:

$$\text{Motor Efficiency} = C1*IACL + K1$$

where C1 is a coefficient and K1 is a constant.

With these equations for the efficiency of an electric motor, motor manufacturers and CRML steel suppliers can now predict the impact on efficiency of changes in the CRML material. For instance, the effect on efficiency of changing the composition of the CRML material can readily be determined based on the IACL and IAP of the new alloy. Similarly, changing the thickness of the laminations of the material will predictably impact motor efficiency as indicated by changes in IACL and IAP. This allows the motor designer to use a thicker lamination with a low core loss material or a thinner lamination with a higher core loss material and obtain the desired efficiency in a motor.

A similar predictive equation can be developed for the stator current in a small single-phase induction motor as a function of IACL which can be expressed as:

$$\text{Stator Current} = C2*IACL + K2$$

where C2 is a coefficient and K2 is a constant.

Stator current in an electric motor is influenced by IACL alone. Again, a linear regression analysis is performed for a single-phase induction motor yielding the predictive equation for stator current which can be expressed as:

$$\text{Stator Current} = 0.068476*IACL + 14.018482.$$

A similar prediction can be made for a three-phase induction motor or any other type of motor.

It is to be understood that the values of coefficients C1, C2 and constants K1, K2 will vary from one performance parameter to another and from one electromagnetic device to another. Variations on the basic predictive equation can be developed for other devices having electromagnetic cores. Testing has shown that IACL has a strong influence on the performance of transformers. Testing has also shown that the commonly relied upon 1.5 Tesla relative permeability for transformer core material is not a factor in transformer performance. The IACL is a determining factor of the energy loss in the laminations of the transformer.

Figure 6:
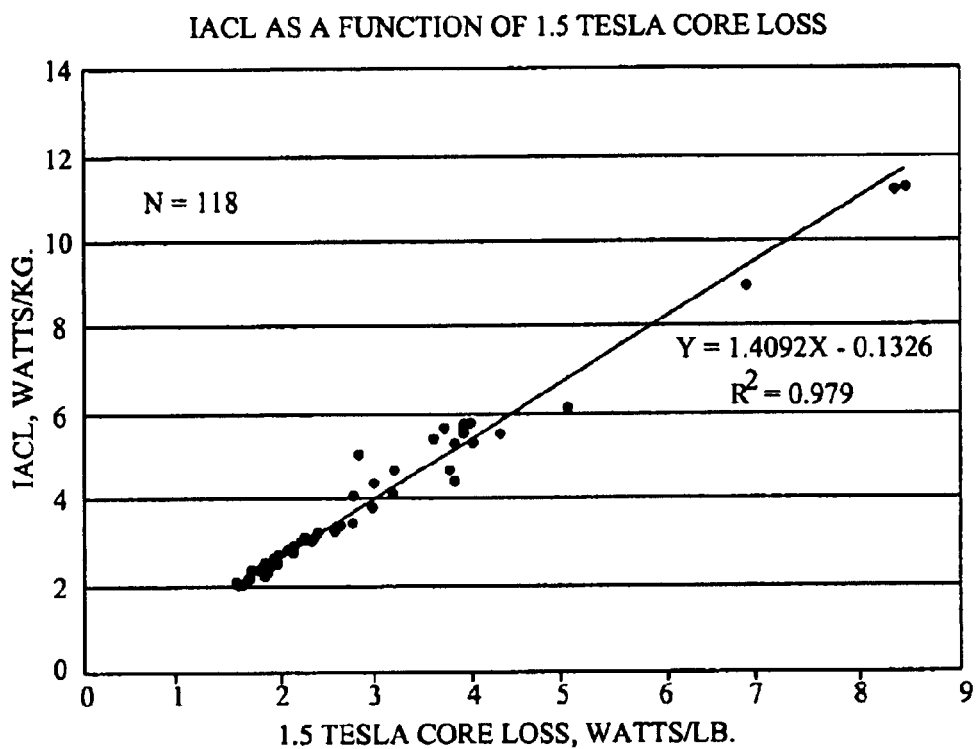
FIG. 6 is a plot depicting the correlation between the IACL and 1.5 Tesla core loss for a several CRML steels.
Figure 7:
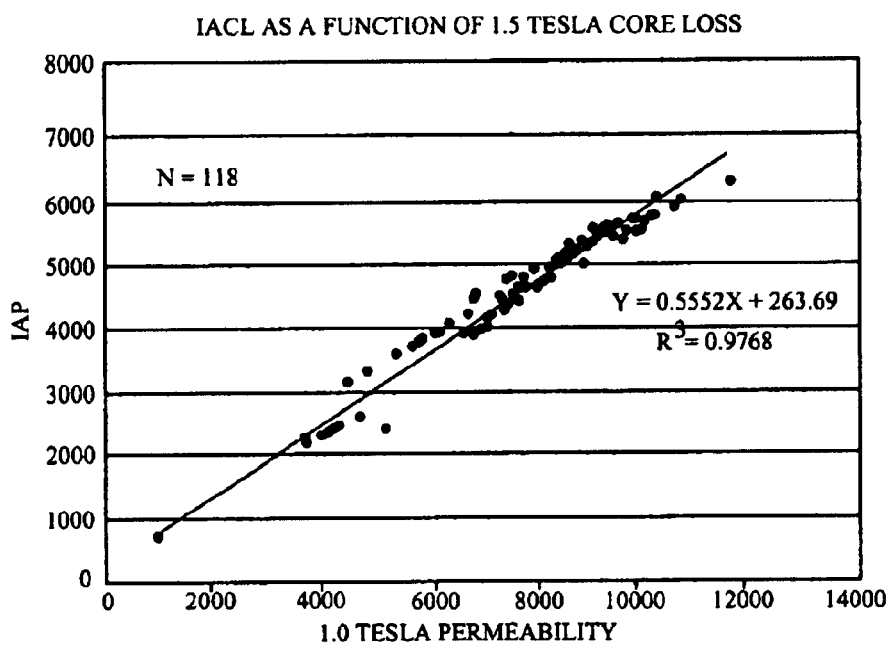
FIG. 7 is a plot depicting the correlation between the IAP and the relative permeability at 1.0 Tesla for several CRML steels.

While the IACL and IAP have been determined to be the most relevant parameters for predicting performance in electromagnetic devices and particularly in electric motors, it is recognized that benefit could be derived from a method of approximating these parameters. This is particularly desirable in the production mill where mill qualification of CRML steels is desired. In the mill, it is unreasonable to undertake what could be a somewhat lengthy process of developing plots of core loss and relative permeability and calculating the IACL and IAP. Testing has indicated that there is a high correlation between the 1.5 Tesla core loss and the IACL and also a high correlation between the IAP and relative permeability at 1.0 Tesla. These correlations are shown in FIGS. 6 and 7. It is apparent that the 1.5 Tesla core loss and the 1.0 relative permeability can be used for mill testing CRML coils.

CRML material as produced at the steel mill is considered semi-processed material. Typically, the device manufacturers add some amount of additional processing to the material in preparation for manufacturing their product. The IACL and IAP as determined at the mill either by direct measurement and calculation of each parameter or as determined indirectly from the 1.5 Tesla core loss and 1.0 Tesla relative permeability are valid for predicting the performance of the finished electromechanical devices.

Figure 8:
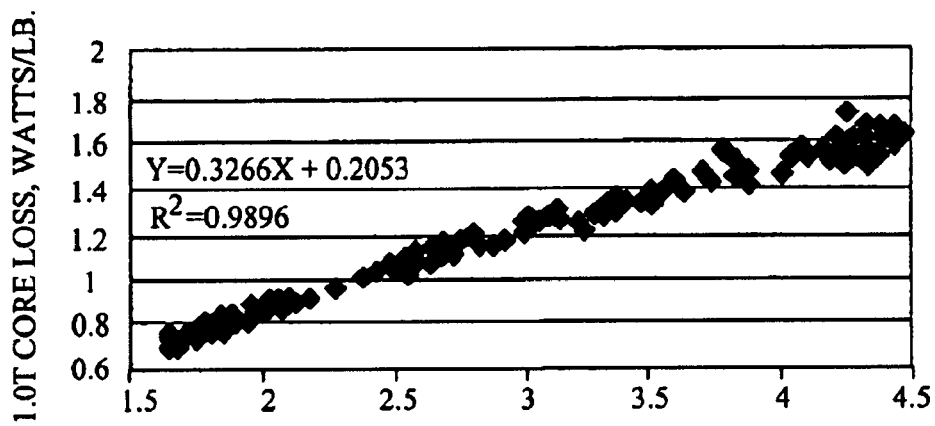
FIG. 8 is a plot depicting the correlation between 1.0 Tesla core loss and 1.5 Tesla core loss for semi-processed material.
Figure 9:
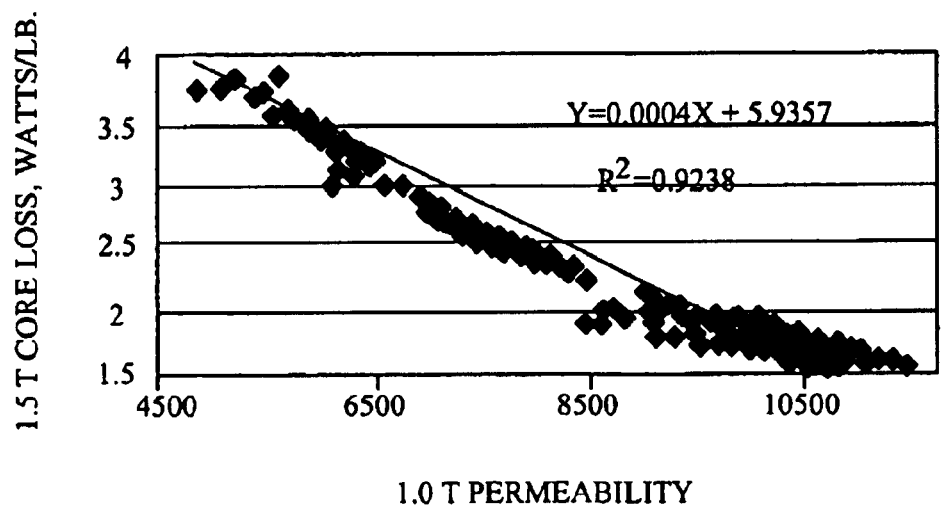
FIG. 9 is a plot depicting the correlation between 1.0 Tesla relative permeability and 1.5 Tesla core loss for semi-processed material.

For semi-processed material, some additional correlations are evident. With reference to FIGS. 8 and 9, it is shown that the core loss at an induced field of 1.5 Tesla correlates highly with both the 1.0 Tesla core loss and the 1.0 Tesla relative permeability. FIGS. 6–9 indicate that the 1.5 Tesla core loss is determinative ultimately of both the IACL and IAP. From the relationships of FIGS. 7 and 9, the IAP can be determined based on the relationship of the 1.5 Tesla core loss to the 1.0 relative permeability which relates to IAP. Similar analysis for semi-processed material can be applied to measurement of the 1.0 Tesla core loss from which IACL and IAP can be determined using the relationships of FIGS. 6–9. However, the correlations between 1.5 Tesla core loss and 1.0 relative permeability do not extend to fully processed material. For fully processed material, IAP must be determined either from measuring the relative permeability over an induced field range or from the 1.0 Tesla relative permeability as earlier described in order to achieve the best prediction of performance in electric motors.

It may also be desirable in the future to specify CRML materials by using one parameter that is derived from the IACL and IAP for each motor performance characteristic desired. This parameter could define a relative CRML motor efficiency index (EI) that would be related to the equations derived above by having the ratio between the coefficients for IACL and IAP be the same. The resulting EI for any alloy could be between 0 and 1 or 0 and 100, with the material having a larger number for the EI being capable of producing a more efficient motor. An example for an EI ranging from 0 to 100 would be $$EI = -7.8 * IACL + 0.0004 * IAP + 96.$$

An EI could be assigned to every CRML based on this equation, and a buyer of CRML could then select a specific CRML for his application based on this number and compare it to other CRML materials available. Similar indexes could be established for other operating parameters if they are affected by the IACL and IAP.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A method for predicting performance parameters of an electromagnetic device based on properties of the device's electromagnetic core material comprising the steps of:

determining an integrated average core loss (IACL) of the core material; and predicting a performance parameter based on said IACL.

2. The method of claim 1 further comprising the step of:

performing a linear regression analysis to derive a coefficient (C1) applied to said IACL and a constant (K1).

3. The method of claim 2, wherein said electromagnetic device is an electric motor, and said performance parameter is motor efficiency, herein said motor efficiency is determined by the equation:

$$\text{Motor Efficiency } (\%) = C1 * IACL + K1.$$

4. The method of claim 2, wherein said electromagnetic device is an electric motor and said performance parameter is stator current in said motor wherein said stator current is determined by the equation:

$$\text{Stator Current} = C2 * IACL + K2.$$

5. The method of claim 1, wherein said step of determining the IACL of the material includes the steps of:

establishing a range of induced magnetic fields over which the device is expected to operate;

measuring a core loss of the core material at a plurality of points within said range of induced fields; and dividing the integral of the measured core loss over said range of induced fields by the integral of the induced fields so that IACL is calculated as:

$$IACL = \int CL\, dB / \int dB$$

where: CL=core loss and
  B=induced field.

6. The method of claim 1, wherein said IACL an be approximated based on a core loss of the core material measured at an induced field of 1.5 Tesla.

7. The method of claim 2 further comprising, before said predicting step, the step of:

calculating said performance parameter for a number of different core materials as a basis for said linear regression analysis.

8. A method for predicting performance parameters of an electromagnetic device based on properties of the device's electromagnetic core material comprising the steps of:

determining an integrated average core loss (IACL) of the core material;

determining an integrated average relative permeability (IAP) of the core material; and predicting a performance parameter based on said IACL and said IAP.

9. The method of claim 8 further comprising the step of:

performing a linear regression analysis to derive a first coefficient (C1) applied to said IACL, a second coefficient (C2) applied to said LAP and a constant (K).

10. The method of claim 9, wherein said electromagnetic device is an electric motor, and said performance parameter is motor efficiency, herein said motor efficiency is determined by the equation:

$$\text{Motor Efficiency } (\%) = C1 * IACL + C2 * IAP + K.$$

11. The method of claim 8, wherein said step of determining the IACL of the material includes the steps of:

establishing a range of induced magnetic fields over which the device is expected to operate;

measuring a core loss of the core material at a plurality of points within said range of induced fields; and dividing the integral of the measured core loss over said range of induced fields by the integral of the induced fields so that IACL is calculated as:

$$IACL = \int CL\, dB / \int dB$$

where: CL=core loss and
  B=induced field.

12. The method of claim 8, wherein said IACL an be approximated based on a core loss of the material measured at an induced field of 1.5 Tesla.

13. The method of claim 8, wherein said step of determining the IAP of the material includes the steps of:

establishing a range of induced magnetic fields over which the device is expected to operate;

measuring the relative permeability of the core material at a plurality of points within said range of induced fields; and dividing the integral of the measured relative permeability over the range of induced fields by the integral of the induced fields so that IAP is calculated as:

$$IAP = \int \mu_R dB / \int dB$$

where: $\mu_R$ = relative permeability and
B = induced field.

14. The method of claim 8, wherein said IAP can be approximated based on a relative permeability of the material measured a an induced field of 1.0 Tesla.

15. The method of claim 9 further comprising, before said predicting step, the step of:

predicting said performance parameter for a plurality of different core materials as a basis for said linear regression analysis.

16. A method for establishing a performance index parameter of a cold rolled motor lamination (CRML) material based on two magnetic properties: the IACL and IAP, comprising the steps of:

determining an integrated average core loss (IACL) of the core material;

determining an integrated average relative permeability (IAP) of the core material; and predicting a performance index parameter based on said IACL and said IAP.

17. The method according to claim 16, further comprising the steps of:

establishing an equation over a predefined range of either 0 to 1 or 0 to 100 for a relative performance index parameter based on said IACL and said IAP; and using said relative performance index parameter to compare the relative applicability of said CRML material to a plurality of other available CRML materials for a given application.

* * * * *

UNITED STATES PATENT AND TRADEMARK OFFICE
CERTIFICATE OF CORRECTION

PATENT NO. : 6,931,353 B2
DATED : August 16, 2005
INVENTOR(S) : Kenneth E. Blazek It is certified that error appears in the above-identified patent and that said Letters Patent is hereby corrected as shown below:

Column 7,
Line 55, delete "herein" and insert -- wherein --.
Line 56, delete "." and insert -- : --.

Column 8,
Lines 13 and 58, delete "an" and insert -- can --.
Line 38, delete "herein" and insert -- wherein --.

Column 9,
Line 11, delete "a" and insert -- at --.

Signed and Sealed this

Third Day of January, 2006

JON W. DUDAS
*Director of the United States Patent and Trademark Office*